US008615423B1

(12) United States Patent
Hernandez

(10) Patent No.: US 8,615,423 B1
(45) Date of Patent: Dec. 24, 2013

(54) METHOD OF RAPID WORKFLOW PROCESS MODELING

(75) Inventor: Roy R. Hernandez, Santa Monica, CA (US)

(73) Assignee: Thirdwave Corporation, Los Angeles, CA (US)

( * ) Notice: Subject to any disclaimer, the term of this patent is extended or adjusted under 35 U.S.C. 154(b) by 721 days.

(21) Appl. No.: 12/383,738

(22) Filed: Mar. 26, 2009

(51) Int. Cl.
*G06Q 10/00* (2012.01)

(52) U.S. Cl.
USPC ....... 705/7.37; 705/7.25; 705/7.26; 705/7.27; 705/7.36; 705/7.38; 705/301

(58) Field of Classification Search
CPC ...... G06Q 10/10; G06Q 10/06; G06Q 10/063
USPC ........... 705/7.25, 7.26, 7.27, 7.36, 7.37, 7.38, 705/301
See application file for complete search history.

(56) References Cited

U.S. PATENT DOCUMENTS

| 7,035,809 | B2 * | 4/2006 | Miller et al. | 705/7.23 |
| 7,251,613 | B2 * | 7/2007 | Flores et al. | 705/7.36 |
| 2002/0065697 | A1 * | 5/2002 | Cautley et al. | 705/7 |
| 2002/0128888 | A1 * | 9/2002 | Chuangsuvanish | 705/8 |
| 2003/0033192 | A1 * | 2/2003 | Zyman et al. | 705/10 |
| 2003/0083915 | A1 * | 5/2003 | Guicciardi et al. | 705/7 |
| 2005/0096950 | A1 * | 5/2005 | Caplan et al. | 705/7 |
| 2006/0004596 | A1 * | 1/2006 | Caniglia et al. | 705/1 |
| 2007/0050239 | A1 * | 3/2007 | Caneva | 705/11 |

OTHER PUBLICATIONS

Clarity, Functional Overview of CA Clarity Project and Portfolio Management System, 2006.*
Greer et al, Building Sustainable Sarbanes-Oxley Management Processes, NIKU 2005 Global User Conferance, 2005.*
UMT Portfolio Manager, Builder User Training, UMT 2005.*
Thirdwave selected projects, archives organization, Feb. 2000.*
Microsoft Project Portfolio 2007—Overview, published by Microsoft Corporation Sep. 2006.*
Microsoft Office Project Portfolio Server 2007—Dashboard, published by Microsoft Corporation 2006.*
Microsoft Office Project Portfolio Server 2007—Optimizer, published by Microsoft Corporation 2006.*

* cited by examiner

*Primary Examiner* — Lynda Jasmin
*Assistant Examiner* — Octavian Rotaru
(74) *Attorney, Agent, or Firm* — Thomas I. Rozsa

(57) ABSTRACT

A method of rapid workflow process modeling, which is established according to a triangulation principle. The method integrates issues of management, operation and technology including information technology that are three fundamentals of a triangulation principle to characterize challenges and opportunities for process improvement of any organization including military units, governmental agencies and public and private business sectors. Specifically, the method is comprised of seven steps such as the As-Is process mapping, problem statements, impact statements, solution statements, benefit statements, To-Be process mapping and cost benefit analysis for generating a quantitative projection of the business cost reduction. Application of the method is able to comprehensively and effectively address challenges and opportunities for all aspects of the organizational process improvement.

1 Claim, 12 Drawing Sheets

| No. | Symbol | No. | Symbol | No. | Symbol | No. | Symbol |
|---|---|---|---|---|---|---|---|
| A01 | 👥 | A02 | ↑ | A03 | Process Step | A04 | ∿ |
| A05 | OK Yes/No | A06 | (A) | A07 | ◰ | A08 | ▨ |
| A09 | ⌭ | A10 | ⚓ | A11 | ✉ | A12 | Working File |
| A13 | Box | A14 | Engineer Maps / Mylars | A15 | Plotter / Scanner | A16 | ⊙ |
| A17 | Binder | A18 | \| \| \| | A19 | Checks | A20 | Film / Fiche |
| A21 | 🎺 | A22 | 🚗 | A23 | 1,4,7 | A24 | 1 Day / Month |
| A25 | Problems | A26 | Impacts | A27 | Solutions | A28 | Benefits |

*FIG. 3*

| No. | Symbol | No. | Symbol | No. | Symbol | No. | Symbol |
|---|---|---|---|---|---|---|---|
| T01 |  | T02 |  | T03 |  Process Step | T04 |  |
| T05 | New Process Step | T06 |  OK Yes/No | T07 | 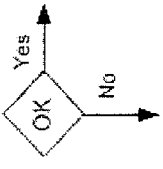 | T08 |  |
| T09 |  | T10 |  | T11 | 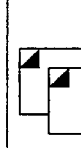 E | T12 |  Ex |
| T13 |  | T14 | 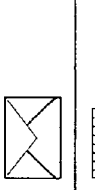 | T15 | 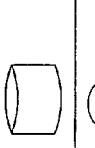 | T16 |  |
| T17 | E-Work File | T18 |  | T19 | Film / Fiche | T20 |  |
| T21 | Mylar's | T22 | 1 Day / Month | T23 | Management / Policy Solutions | T24 | Process / Operational Solutions |
| T25 | Information Technology Solutions | | | | | | |
FIG. 4

Potential Benefit Calculations

| | Data / Calcs | $ / Year | Oppor Subtotal | Bus Unit Subtotal |
|---|---|---|---|---|
| Name of Business Process Here | | | | |
| Problem 1: Problem Statement from Rapid Workflow Session | | | | |
| Impact 1.1: Impact Name from Working Session | | $0.00 | | |
| Costs: | | | | |
| o Number of (enter appropriate number) per month | 0 | | | |
| o Percent of (enter appropriate item, transaction, customer, etc.) | 0% | | | |
| o Number of Staff impacted by this process | 0.00 | | | |
| o Percentage of time spent | 0% | | | |
| o Staff title(s): do a separate alculation for each staff title | | | | |
| o Staff pay rates per hour, per year, as appropriate | 0.00 | | | |
| o Total Cost per Year | 0.00 | | | |
| o Efficiency Savings Factor: estimate % reduction of the impact (cost) if the solution were implemented | 0% | | | |
| | 0.00 | | | |
| Yearly Cost of Existing Inefficiency | $0.00 | | | |
| Efficiency Factor | 0% | | | |
| Potential Benefits (Yearly Inefficiency Cost x Efficiency Factor) | $ | - | | |
| Total Potential Benefits year 1 | | | $0 | |
| Total Potential Benefits Over 5 Years | | | $0 | |

Problems: | General:

1. The Note Sheet is not effective, i.e. information on it can be overlooked (also, keeping track of special notes in not effective).
2. Duplicate data entry into HIPR (Access database) and RAP (Mainframe system) – occurs every time – have to enter data into Access dB to print out the Workup Sheet for approval, then into RAP (after approval) for payment. (1 person does this).
3. Maintaining the historical data, currently two files are kept on everyone – the paper work is expanding. Historical records gets boxed and sent to the Admin Services for future microfilming.
4. Maintaining security with member information – File cabinets do not have locks. Pervasive throughout the section- this applies during office hours. Applies to rolling cabinet as well.
5. Moving member files in rolling cabinets (3 carts total).
6. Managing and processing all the paperwork that comes in with claim. (Size of documents varies, whiteout checks, etc.)

A26q

Impacts:

1. Overpayments / underpayment can be made. Need to recapture the money. The cash flow to members is being impacted. Happens about twice per year.
2. Duplicate data entry takes approximately 8 hours per quarter, that can amount to a lot of wasted time for Benefits Specialist.
   - Can cause a propensity for errors.
3. 1 week per year for Clerk Typist to create new files and box-up the old ones.
4. Potential liability:
   - Because of the sensitive nature of data, they are not in compliance with HIPPA.
5. Laborious, time consuming. Carts are not ergonomic (possible Worker's Comp liability). The carts are really heavy.
6. Have to photocopy and shred the documents that were submitted, creates more work for staff.

A27q

Solutions:

1. - Capture (scan) the claim and associated documents at the beginning of the process (by Clerk Typist).
   - Make the Note sheet an e-form.
   - Implement a Document / Content Management system to store documents.
     A. Use the ECMS to process claim.
     B. Use Automated Workflow to process the claim.
   - Consider integrating the Automated Workflow with existing systems.
   - Approval, authorization, signature capability.
2. - Adopt Onpoint to replace the Access database.
   - Consider integrating Onpoint to the ECM / AW.
3. Same as #1 – ECMS solution.
4. Same as #1 – ECMS solution.
5. AW / ECMS
6. Same #1.

A28q

Benefits:

1. - Staff will be happier.
   - Save storage space.
   - Will have more time for higher-level work.
   - Will streamline the claims process, staff would not have to wait for batches of folders; multiple staff would work on multiple files simultaneously (Enhance flexibility for staff).
   - Allow for storage of information that they do not have space for now, e.g. white papers, training materials, etc.
2. Staff time savings.
3. - Same as #1.
   - Some cost savings, by not having to copy files; save on file cabinets, carts, and office space.
4. Meet HIPPA requirements; mitigate exposure to risks and possible lawsuits.
5. - Staff time savings.
   - Mitigate on-the-job injuries.
6. Same as #1 and #3.

*FIG. 8B*

| Management / Policy Solutions (T23q) | Process / Operational Solutions (T24q) | Information Technology Solutions (T25q) |
|---|---|---|
| M 1. The capturing (scanning) of the claim (and associated documents) at the beginning of the process will require that a management decision be made on the allocations of resources to do an activity that does not exist in the current business process [2]. (The pros and cons of scanning being done by individual sections (the Clerk Typist in this case) or by a centralized Scanning Group will be addressed in Phase 4, the Implementation Plan.)<br><br>M 2. The policy regarding the use of E-Signature needs to be addressed and resolved within LAFFP, in addition to LAFPP and other City organizations.<br><br>M 3. The integration of the Automated Workflow with existing systems, i.e., OnPoint [2, 5], will require that Management address interfacing the ongoing OnPoint project with the proposed ECMS project, and that appropriate resources be allocated to that effort. | P 1. Scan the HIPR Claim Form (and associated documents) at the beginning of the process. [2]<br><br>P 2. Eliminate staff distributing files using the file cart. [3, 5, 6, 7]<br><br>P 3. Eliminate several existing work activities:<br>· Staff filing Active / Working files in the file cabinet (and the file cabinets themselves) [8];<br>· Boxing Inactive files [8];<br>· Boxing up files for transmittal to the Records Management Division [8];<br>· Microfilming by Records Management (deleted in this business process map). | T 1. Implement an IBM E-Form for the Note Sheet. [2]<br><br>T 2. Implement Imaging System to capture the claim and associated documents at the beginning of the process, to start the E-Working File. [2]<br><br>T 3. Implement a ECMS to to process claim and store documents in the E-Working File.<br><br>T 4. Consider future implementing Automated Workflow to process the claim.<br><br>T 5. Provide approval, authorization, and E-Signature capability. [6]<br><br>T 6. Provide an online Claim Form with E-Signature capability. [1]<br><br>Other non-ECMS Project specific IT solutions:<br>T 7. Adopt OnPoint to replace the existing HIPR Access database. [5]<br>T 8. Explore the feasibility of integrating OnPoint to the ACME / AW. [5] |

*FIG. 9B*

| 1.1 Report Distribution | | |
|---|---|---|
| Problem 1: | Duplicate copies made | |
| Impact 1.1: | Reports are being discarded without being read | |
| Impact Calc | Reproduction Cost: | Cost: |
| | o 130k incident reports / year x 10 pg ea | o Hardware Cost    50,000 |
| | o 1,300,000 pgs x 10 copies | o Software Cost    100,000 |
| | o 10,000,000 copies / year | o Professional Services    200,000 |
| | Total Cost per Year: | Total One Time Costs:    350,000 |
| | o Copies @ 5 cent / copy    500,000 | Ongoing Maint. Costs / Yr.:    90,000 |
| | o Paper @ 20,000 reams    60,000 | |
| | o 60% are tossed immediately    336,000 | |
| | Efficiency Factor    80% | Total One Time Costs:    350,000 |
| | Yearly Cost of Existing Inefficiency    268,800 | |
| | Solution 1.1 Implement ECMS | |
| Potential Benefits | 268,800 | Cost Year 1    $350,000 |
| (Yearly Cost x Efficiency Factor) | | Ongoing Yearly Costs:    $90,000 |

*FIG. 10*

METHOD OF RAPID WORKFLOW PROCESS MODELING

BACKGROUND OF THE INVENTION

1. Field of the Invention

The present invention is related to a business management techniques, which apply a triangulation principle that combines the issues of management, operation and technology to achieve an optimum improvement in the way a portion of a business operation is managed and operated.

2. Description of the Prior Art

Various different business management techniques have been utilized in the prior art. The following six patents and published patent applications are the closest prior art references which are related to the present invention.

1. United States Published Patent Application No. 2002/0128888 to Watsaka Chuangsuvanish on Sep. 12, 2002 for "Reflexzplan" (hereafter the "Chuangsuvanish Published Patent Application");

2. United States Published Patent Application No. 2003/0033192 to Sergio Zyman et al. on Feb. 13, 2003 for "Strategic Marketing Planning Processes, Marketing Effectiveness Tools And Systems, And Marketing Investment Management" (hereafter the "Zyman Published Patent Application");

3. United States Published Patent Application No. 2003/0083915 to Diego Gucciardi et al. on May 1, 2003 for "Process Development Process Methodology" (hereafter the "Gucciardi Published Patent Application");

4. United States Published Patent Application No. 2005/0096950 to Scott Malcom Caplan et al. on May 5, 2005 for "Method And Apparatus For Creating And Evaluating Strategies" (hereafter the "Caplan Published Patent Application");

5. U.S. Pat. No. 7,035,809 issued to Michael P. Miller et al. and assigned to Accenture Global Services GmbH on Apr. 25, 2006 for "Accelerated Process Improvement Framework" (hereafter the "Miller Patent"); and 6. U.S. Pat. No. 7,251,613 issued to David R. Flores et al. on Jul. 31, 2007 for "System And Method For Generating A Multi-Layered Strategy Description Including Integrated Implementation Requirements" (hereafter the "Flores Patent").

The Chuangsuvanish Published Patent Application discloses a dynamic software which is comprised of a dynamic financial accounting spreadsheet. The software is developed based on business concepts of generating a prototype workflow of a business process, evaluating the prototype workflow of the process, generating a Process Development Process (PDP) workflow and populating a PDP toolkit using a result of the evaluation of the prototype workflow.

The Zyman Published Patent Application discloses planning tools for guiding marketing professionals. The tools include steps of performing a situation assessment, identifying opportunities, developing growth strategies, developing growth tactics, and developing ways to measure the results of the steps.

The Gucciardi Published Patent Application discloses a method for developing a process comprising the steps of generating a prototype workflow of the process, evaluating the prototype workflow of the process, and generating a Process Development Process (PDP) workflow and populating a PDP toolkit using a result of the evaluation of the prototype workflow.

The Caplan Published Patent Application discloses a method and an apparatus for strategy science methodology involving computer implementation. Some structural elements of the preferred embodiments of the Application include Strategy Situation Analysis, Decision Key and Intermediate Variable Creation, Data Exploration, Decision Model Structuring and Decision Model Quantification.

The Miller Patent discloses a computerized process for accelerating improvement to a more mature software product including the step of maintaining a Software Engineering Process Group (SEPG). The patented invention is a method and related system for assisting and expediting an organization's transformation toward higher levels of the Capability Maturity Model (CMM) or higher derivative maturity models. In particular, the invention provides a method for producing a more mature product. A preferred embodiment of the method comprises the management of an organization developing the product whereby the organizational management comprises managing personnel of the organization and implementing a product improvement process.

The Flores Patent discloses an enterprise strategy management system including three software modules. The first software module formulates a strategy description based on an assessment of environmental data. The second module aligns the strategy description with available enterprise resources and deploys strategy implementation responsibility. The third module measures the execution of the strategy and identifies opportunities to optimize strategic performance.

There is a significant need to provide a method which is based on a triangulation principle to combine the fields of management, operation and technology including the information technology for deriving an optimum business process to thereby achieve results of reduced costs, increased efficiency and improved effectiveness in operating a business.

SUMMARY OF THE INVENTION

The present invention is a method of rapid workflow process modeling (RWPM), which is established according to a triangulation principle. The method integrates issues of management, operation and technology including information technology that are three fundamentals of the triangulation principle to characterize challenges and opportunities for business process improvement of an organization that include military units, governmental agencies and public and private business sectors.

The method is comprised of three validated phases, including a RWPM As-Is business process modeling phase that is validated by end user stakeholders who issue a review process, a RWPM To-Be business process modeling phase and a RWPM cost/benefit analysis phase that are validated by a management review and approval process. The review process is further comprised of a business process owner review and validation, an information technology (IT) review and validation, and a management review and validation. The management review and approval process is comprised of a business unit manager review, an IT manager review and an executive manager review.

Specifically, application of the present invention method comprises seven steps including As-Is process mapping, problem statements, impact statements, solution statements, benefit statements, To-Be process mapping and cost benefit analysis for generating quantitative projection of the business cost reduction. Therefore, the present invention methodology has the ability to comprehensively and effectively address challenges and opportunities for all aspects of an organization business process improvement.

The present invention creates two sets of symbols to graphically disclose various types of items, processes, actions and human thoughts that are associated with business process improvement (BPI) for the respective As-Is process modeling and To-Be process modeling. It will be appreciated that application of the symbols standardizes the respective As-Is process modeling and To-Be process modeling and makes them efficient and powerful for mitigating challenges, prioritizing opportunities and driving process improvement on an organizational event.

A first set of 28 symbols are used with the As-Is process modeling. They are related to the respective customer, directional arrow, process step box, electronic process directional arrow, decision tree, hard copy document(s), hard copy package(s), existing system, anchor, envelope, hard copy working file, box, engineering document, large format scanner/plotter, CD-ROM, binder, vertical file system, hardtop index document(s), Micro-film/Microfiche, file cart, car, red problem number keys, duration notation, problem statements, impact statements, solution statements, and benefits statements.

A second set of 25 symbols are used with the To-Be process modeling, which are related to the respective blue customer, blue directional arrow, process step box, blue electronic process directional arrow, yellow process step box, blue decision tree, existing hard copy document(s), new electronic document(s)/content, hard copy package(s), new multiple electronic document(s), electronic form, electronic form with e-signature, existing system, new database, blue envelope, blue e-mail envelope, blue e-working file, blue CD-ROM, blue Micro-film/Microfiche, blue large format scanner, blue engineering documents, final management/policy solutions, blue duration notation, final information technology, final process/operational solutions.

In summary, as compared with the As-Is process model, the To-Be process model possesses characteristics of having a few steps, applying advanced ways to connect to business steps, employing advanced items for conducting each business step in addition to less frequent usage of the items to thereby achieve better business opportunities regarding reduced costs, increased efficiency and improved effectiveness in business.

It is therefore an object of the present invention to provide a method of rapid workflow process modeling (RWPM) which is established according to a triangulation principle, wherein the method integrates issues of management, operation and technology including information technology that are three fundamentals of the triangulation principle to characterize challenges and opportunities for business process improvement of an organization that include military units, governmental agencies and public and private business sectors.

It is another object of the present invention to provide a method of rapid workflow process modeling (RWPM), which is comprised of three validated phases, including a RWPM As-Is business process modeling phase that is validated by end user stakeholders who issue a review process, a RWPM To-Be business process modeling phase and a RWPM cost/benefit analysis phase that are validated by management review and approval process. The review process is further comprised of a business process owner review and validation, an information technology (IT) review and validation, and a management review and validation. The management review and approval process is comprised of a business unit manager review, an IT manager review and an executive manager review.

It is also an object of the present invention to provide a method of rapid workflow process modeling (RWPM), wherein, application of the methodology includes seven steps such as As-Is process mapping, problem statements, impact statements, solution statements, benefit statements, To-Be process mapping and cost benefit analysis for generating quantitative projections of business cost reductions. Therefore, the present invention method has the ability to comprehensively and effectively address challenges and opportunities to improve all aspects of an organization in business.

It is another object of the present invention methodology of rapid workflow process modeling to provide two sets of symbols which graphically disclose various types of items, processes, actions and human thoughts that are associated with BPI for the respective As-Is process modeling and To-Be process modeling, so that application of the symbols standardizes the respective As-Is process modeling and To-Be process modeling and makes them efficient and powerful for mitigating challenges, prioritizing opportunities and driving process improvement on an organizational event.

It is an additional object of the present invention to provide As-Is process modeling and To-Be process modeling, wherein as compared with the As-Is process modeling, the To-Be process modeling has the benefits of only having a few steps, applies advanced ways to connect to business steps, and employs advanced items for conducting each business step in addition to less frequent usage of the items to achieve better business opportunities which results in reduced costs, increased efficiency and improved effectiveness in business.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is a table to summarize symbols that are created by the present invention. The symbols are used to derive an "As-Is" process map, which is the core content of the present invention method;

FIG. 4 is a table to summarize symbols that are created by the present invention. The symbols are used to derive a "To-Be" process map that is a result of the sixth step of the present invention method;

FIG. 7 is a table which illustrates how to calculate generic potential benefits during the seventh step of the present invention;

FIG. 8A and FIG. 8B jointly is an example of an "As-Is" process map for health insurance premium reimbursements (HIPR), which is obtained by applying the core content of the As-Is process modeling of the present invention method;

FIG. 9A and FIG. 9B jointly is an example of a "To-Be" process map for HIPR health insurance premium reimbursements, which is obtained after implementing outcomes of the As-Is process modeling; and FIG. 10 is a table of the potential benefit calculations for the example of the HIPR health insurance premium reimbursements generated by application of the present invention.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a methodology of rapid workflow process modeling which is based on a triangulation principle. The method integrates issues of management, operation and technology including information technology that are three fundamentals of the triangulation principle to characterize challenges and opportunities for process improvement of any organization including military units, governmental agencies and public and private business sectors. Specifically, the methodology is comprised of seven steps including As-Is process mapping, problem statements, impact statements, solution statements, benefit statements, To-Be process mapping and cost benefit analysis for generating a quantitative projection of the business cost reduction. Application of the method results in comprehensively and effectively addressing challenges and opportunities for all aspects of the organizational process improvement.

Figure 1:
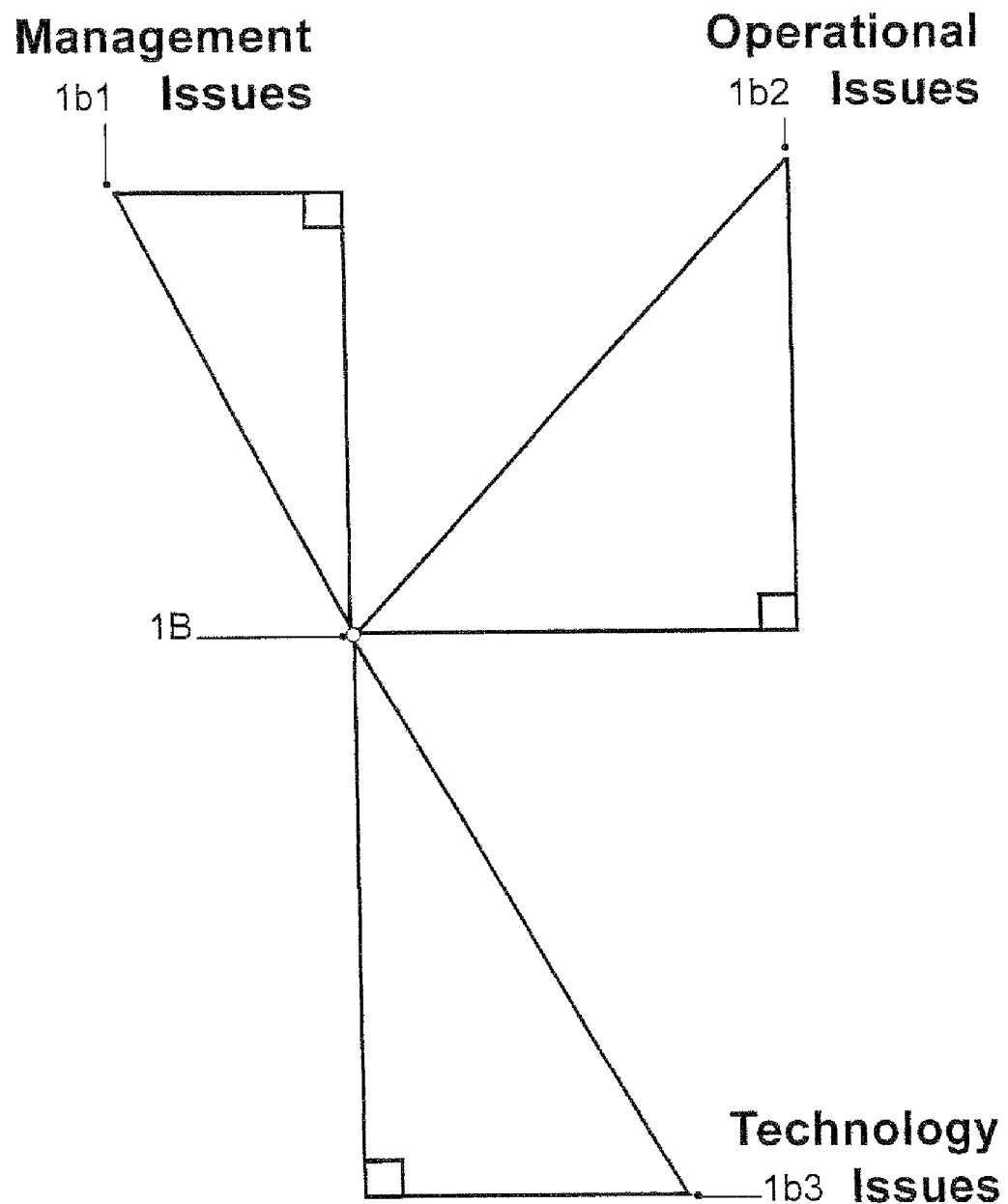
FIG. 1 is a schematic diagram, which illustrates a triangulation principle that serves as a foundation of the present invention method of rapid workflow process modeling.

Referring to FIG. 1, there is illustrated the present invention triangulation principle 1B, which is comprised of three fundamentals, which are management issues 1$b$1, operational issues 1$b$2 and technology including information technology issues 1$b$3. The triangulation principle uses a variety, of research methods to gain a diverse source of data pertaining to a specific research problem or question. This process helps to enhance the validity of data since it does not overly rely on any particular method. Omitting any one of the sources produces an incomplete assessment. For example, in the case of global positioning systems (GPS), without three satellites to triangulate, it is impossible to determine location on the surface of the earth. These three issues are used to achieve a process improvement for a business situation or other operation which is conducted by an organization. It will be appreciated that the triangulation principle of the present invention applies to all types of events including business process events and activities which occur in any type of organization of our society that include military units, governmental agencies and private and public business enterprises. Application of the present invention method results in rapidly discovering the comprehensive challenges and opportunities that qualitatively and quantitatively address all aspects in the process improvement which includes the business process improvement (BPI).

Figure 2:
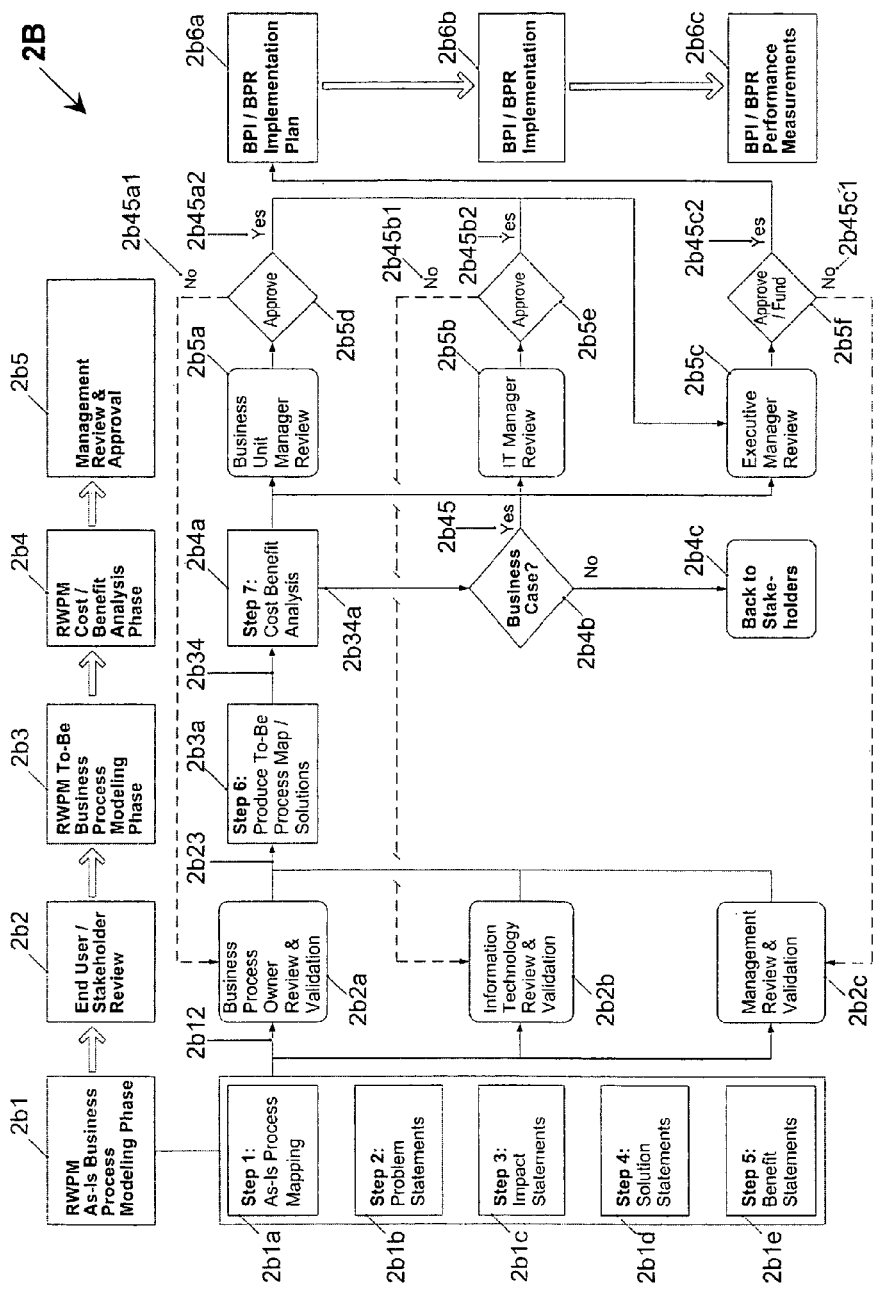
FIG. 2 is a flow chart, which specifically illustrates seven steps in the present invention method.

Referring to FIG. 2, there is illustrated flow chart 2B of the present invention method of rapid workflow process modeling (RWPM). Specifically, the chart highlights how the RWPM method is used when improving an organizational event. As illustrated, the method is comprised of three validated phases: a RWPM As-Is business process modeling phase 2$b$1 that is validated by end user stakeholders who issue a review process 2$b$2, a RWPM To-Be business process modeling phase 2$b$3 and a RWPM cost/benefit analysis phase 2$b$4 that are validated by management review and approval process 2$b$5.

Within the phase 2$b$1 of the RWPM As-Is business process modeling there are five steps which include As-Is process mapping 2$b$1$a$, problem statements 2$b$1$b$, impact statements 2$b$1$e$, solution statements 2$b$1$d$ and benefit statements 2$b$1$e$. As illustrated, when completing the As-Is modeling phase 2$b$1 to analyze the organizational event, an outcome 2$b$12 obtained through the modeling is validated by a process of an end user stakeholder review 2$b$2. The review process is comprised of a business process owner review and validation 2$b$2$a$, an information technology review and validation 2$b$2$b$ and a management review and validation 2$b$2$c$ which are in parallel in terms of the business flow.

When the review 2$b$2 is completed, a validated outcome 2$b$23 will be transferred into the RWPM To-Be business process modeling phase 2$b$3 for producing To-Be process map/solutions 2$b$3$a$. That is the sixth step of the present invention methodology. During the step of constructing the To-Be process map/solutions, solutions in the management/policy, process/operation and information technology that are rationalized in the As-Is modeling phase 2$b$1 will be implemented. Therefore, the existing As-Is process can be simplified to thereby obtain the To-Be process map. The To-Be process map has characteristics of less operational steps, simpler pathways and advanced electronic equipment which are applied more efficiently as compared with the As-Is process map.

In this setting, as illustrated in FIG. 2, a simplified outcome 2$b$34 of the business process improvement from Step 6 is entered into the RWPM cost/benefit analysis phase 2$b$4. Within the cost/benefit analysis plan 264 there is the seventh step of the present invention method which is a cost benefit analysis 2$b$4$a$ for generating a quantitative benefit forecast 2$b$34$a$. The forecast is further judged by a decision making step 2$b$4$b$ having two possible decisions, "Yes" and "No". If the decision "No" is selected, then the rejected business process improvement is sent into a step 2$b$4$c$ of back to stakeholder. If the decision "Yes" is selected, the agreed business process improvement 2$b$45 is forwarded to a process 2$b$5 of management review and approval, wherein there are three additional parallel review processes including a business unit manager review 2$b$5$a$, IT manager review 2$b$5$b$ and executive manager review 2$b$5$c$.

It will be appreciated that these three review processes 2$b$5$a$, 2$b$5$b$ and 2$b$5$c$ are correlated to the respective three review processes 2$b$2$a$, 2$b$2$b$ and 2$b$2$c$ in the process 2$b$2 of the end user/stakeholder review. Therefore, referring to FIG. 2, if either the business unit manager review 2$b$5$a$ or IT manager review 2$b$5$b$ disapproves the agreed forecast 2$b$45 at the respective decision making steps 2$b$5$d$ and 2$b$5$e$, the respective disapproved forecast 2$b$45$a$1 or 2$b$45$b$1 will be fed back the respective business process owner review and validation 2$b$2$a$ and information technology review and validation 2$b$2$b$. However, if both the business unit manager review 2$b$5$a$ and IT manager review 2$b$5$b$ approve the forecasted business process improvement 2$b$45, the respective approved forecasted business process improvements 2$b$45$a$2 and 2$b$45$b$2 will be sent to the executive manager review 2$b$5$c$ for an additional approval.

Referring further to FIG. 2, if the executive manager review 2$b$5$c$ at the decision making step 2$b$5$f$ disapproves an outcome that is combined with the approved forecasts 2$b$45$a$2 and 2$b$45$b$2, the disapproved combined outcome 2$b$45$c$1 will be fed back to the prior management review and validation 2$b$2$c$. However, if the executive manager review 2$b$5$c$ approves the forecasts 2$b$45$a$2 and 2$b$45$b$2, an outcome 2$b$45$c$2 that is combined with the forecasts 2$b$45$a$2 and 2$b$45$b$2 will be sent to be processed in the following sequential order: BPI/BPR implementation plan 2$b$6$a$, BPI/BPR implementation 2$b$6$b$ and BPI/BPR Performance Measurement 2$b$6$c$.

Referring to FIGS. 3 and 4, it will be appreciated that when conducting the As-Is business process modeling and To-Be process modeling, the present invention creates two sets of the respective symbols that graphically disclose various types of items, processes, actions and human thoughts that are associated with process improvement including BPI. Specifically, they include problems, impacts and solutions, and benefits if the solution were to be implemented. Therefore, application of the respective sets of the symbols standardizes the As-Is process modeling and To-Be process modeling, and makes them efficient and powerful for mitigating challenges, prioritizing opportunities, and driving process improvement to conduct the organizational event.

Referring to FIG. 3, there is illustrated a first set of 28 symbols specifically used for the As-Is process modeling. As illustrated, a symbol A01 of the customer indicates an internal or external customer coming to initiate or receive products and/or services. A symbol A02 of the directional arrow indicates the direction of a process on steps going forward. A dashed line with a directional arrow indicates a feedback loop. A symbol A03 of the process step box indicates a step in an existing business process. The title of the person(s) responsible for the task and bullet points of the activities performed are noted below the process step box. A symbol A04 of the electronic process directional arrow indicates a process that is carried out electronically, either through existing commercial-off-the-shelf software or a custom developed application, e-mail, batch program, or some other form of technology. A dashed line with a directional arrow indicates a feedback loop.

A symbol A05 of the decision tree indicates Yes/No options or decision in an existing business process. A symbol A06 of the continuation bubble is placed at the end of a directional arrow, which indicates a business process that is continued on the following page of a business process map. A symbol A07 of the hard copy document(s) indicates a system produced document (as output), or documents that start out as hard copy. An "E" or "F" in the symbol indicates the respective e-mail or fax. A symbol A08 of the hard copy package(s) indicates multiple documents assembled to produce a package of documents. An "E" or "F" inside the symbol indicates the respective e-mail or fax.

A symbol A09 of the existing system indicates an existing computer system, e.g., database, commercial off-the shelf software, or custom developed application. The type of database and/or application name is noted inside or adjacent to the symbol. A symbol A10 of the anchor indicates a cross-functional problem statement/challenge where an external department or organization adversely impedes the effective execution of a business process. The resolution of the existing problem is outside the authority of the immediate management team. Therefore, these problems require collaboration at the enterprise level.

A symbol A11 of the envelope indicates a process step carried out by mail, internal or external correspondence. An "E" in the envelope indicates an e-mail. A symbol A12 of the hard copy working file indicates a group of hard copy associated documents stored in a folder or folders. A symbol A13 of the box indicates existing hard copy file storage including onsite/offsite document archives. A symbol A14 of the engineering document indicates existing electronic file storage on CD or DVD format, onsite/offsite document archive's which include any type of data format stored on a CD and/or DVD, including alpha-numeric data, scanned images/digital graphics, digital photos, video, or digital sound recordings.

A symbol A15 of the large format scanner/plotter indicates output devices commonly used in engineering/scientific environments. It will be appreciated that other typical output devices are not shown in the symbol A15, as compared with the shown scanner and plotter that have specific technical requirements. A symbol A16 of the CD-ROM indicates existing electronic file storage on CD or DVD format, onsite/offsite document archives which include any type of data format stored on a CD and/or DVD including alpha-numeric data, scanned images/digital graphics, digital photos, video, or digital sound recordings.

A symbol A17 of the binder indicates existing hardtop document/record storage or document filing in binders. A symbol A18 of the vertical file system indicates existing hardtop storage in filing cabinets or filing systems and/or onsite/offsite document archives. A symbol A19 of the hardtop index document(s) indicates a check or index card size document which serves as output, or documents that start out as hardtop. A symbol A20 of the Micro-film/Microfiche indicates Micro-film/Microfiche media as either rolls of film or cards. A symbol A21 of the file cart indicates the physical distribution of documents/files by staff using a filer cart. A symbol A22 of a car indicates a step in the process carried out by automobile, or movement of information by a vehicle.

A symbol A23 of the red problem number keys articulates problems/challenges in the existing business process, identifies any obstacle to the effective and efficient execution of a business process task or service delivery activities to customers. A symbol A24 of the duration notation indicates the time line duration of a process step, steps, or phases in a business process. Duration units can be identified in units of days, weeks, months, or years, as appropriate to the task and business process being modeled.

A symbol A25 of the problem statements articulates problems/challenges in the existing business process, identifies any obstacle to the effective and efficient execution of a business process task or service delivery activities to customers. The problems include process bottlenecks, redundancies, process/communication disconnects, inability to access information and any obstacle to the effective/efficient execution of a task or service delivery. The symbol A25 is in the color red. A symbol A26 of the impact statement indicates impact(s) resulting from a specific problem statement. An impact can be classified as a quantitative impact that can be measured by time increments such as minutes, hours, days, weeks and months or dollars, and qualitative impacts including customer services or quality of work and perception of the quality of the work by the customer. Impact statements can apply to internal operations or external service delivery activities to customers/business partners. The impact statement symbol is generally in the color orange.

A symbol A27 of the solution statement articulates possible policy, process and/or technology solution as identified by stakeholders/business process owners or subject matter experts. The solution statement symbol is generally in the color blue. A symbol A28 of the benefits statement indicates quantitative and qualitative benefits to the internal business process if the proposed solution were to be implemented. Benefits can occur at the departmental or enterprise level and or/externally to customers. The benefits statement symbol is generally in the color green.

It will be appreciated that, similar to the first set of the created symbols for conducting the As-Is process modeling, the present invention also creates a second set of 25 symbols for the To-Be process modeling which are used to construct the To-Be process map.

Referring to FIG. 4, a symbol T01 of the customer indicates an internal or external customer coming to initiate or receive products and/or services. A symbol T02 of the directional arrow in the color blue indicates the direction of a process on steps going forward. A dashed line with a directional arrow indicates a feedback loop. A symbol T03 of the process step box indicates a step in an existing business process. The title of the person(s) responsible for the task and brief bullets of the activities performed are noted below the process step box. An electronic process directional arrow symbol T04 in the color blue indicates a process that is carried out electronically, either through existing commercial-off-the-shelf software or a custom developed application, e-mail, batch program, or some other form of technology. A dashed line with a directional arrow indicates a feedback loop.

A symbol T05 of the yellow process step box indicates a new step in a business process. A symbol T06 of the blue decision tree indicates Yes/No options or decision in an existing business process. A symbol T07 of the existing hard copy document(s) indicates a system produced document (as output), or documents that start out as hard copy. An "E" or "F" in the symbol indicates the respective e-mail or fax. A symbol T08 of the new electronic document(s)/content indicates a system produced document (Word, Excel, PowerPoint, PDF, etc), or documents that start out as hard copy but are scanned and stored electronically. This also could include future digital photos, digital video, or digital recordings. A symbol T09 of the hard copy package(s) indicates multiple documents assembled to produce a package of documents. An "E" or "F" inside the symbol indicates the respective e-mail or fax. A symbol T10 of the new multiple electronic document (s)/content indicates multiple documents assembled electronically to produce a package of documents. An "E" or "F" inside the symbol indicates the respective e-mail or fax documents.

A symbol T11 of the electronic form having a character "E" indicates a standard electronic form produced and used in a standalone fashion, produced and/or posted on an intranet website as an interoffice e-form processed in an automated workflow application. A symbol A12 of the electronic form with E-signature indicates a standard electronic form produced and used in a standalone fashion, produced and/or posted on an intranet website as an interoffice e-form processed in an automated workflow application. An "X" in the document symbol indicates a requirement for an E-signature. A symbol T13 of the existing system indicates an existing computer system, e.g., database, commercial off-the-shelf software, or custom developed application. The type of database and/or application name is noted inside or adjacent to the symbol. A symbol T14 of the new database indicates an existing computer system, e.g., database, commercial off-the-shelf software, or custom developed application. The type of database and/or application name is noted inside or adjacent to the symbol. The symbol, is shaded yellow.

A symbol T15 of the blue envelope indicates a process step carried out by mail, internal or external correspondence. An "E" in the envelope indicates e-mail. A symbol T16 of the blue e-working file indicates a group of electronically associated documents stored in a database, an electronic folder/server in a computer system, and/or a Document/Records Management System. A symbol T17 of the blue e-working file indicates a group of electronically associated documents stored in a database, an electronic folder/server in a computer system, and/or Document/Records Management Systems. A symbol T18 of the blue CD-ROM indicates new electronic file storage on CD or DVD format, onsite/offsite document archives, which includes any type of data format stored on a CD and/or DVD including alpha-numeric data, scanned images/digital graphics, digital photos, video, or digital sound recordings. A symbol T19 of the blue micro-film/microfiche indicates micro-film/microfiche media in either rolls of film or cards, which has been scanned and is stored on a system or Electronic/Records Management System.

A symbol T20 of the blue large format scanner indicates a small or large format document capture device. A symbol T21 of the blue engineering document indicates an engineering document produced electrically on a computer system, e.g. Computer Aided Design and/or Geographic Information System. A symbol T22 of the blue duration notation indicates the time line duration of a process step(s) or phases in a business process. Duration units can be identified in units of days, weeks, months, or years, as appropriate to the task and business process being modeled.

A symbol T23 of the management/policy solution indicates the final solutions identified in the To-Be working session, including new management policies and practice that are required as a result of introducing new information technology solution and/or business process changes. Common examples include policy statements, organizational change, service level agreements, etc. A symbol T24 of the process/operational solution indicates the final process solutions identified in the To-Be working session. These solutions entail the introduction of new business process steps, or the elimination of existing process steps. A symbol T25 of the information technology (IT) solution indicates the final IT solutions identified in the To-Be working session. These solutions entail a variety of solutions including an introduction of new IT, a replacement of existing IT, an enhancement of existing IT/Systems to support new management policies and an integration of existing systems.

Figure 5:
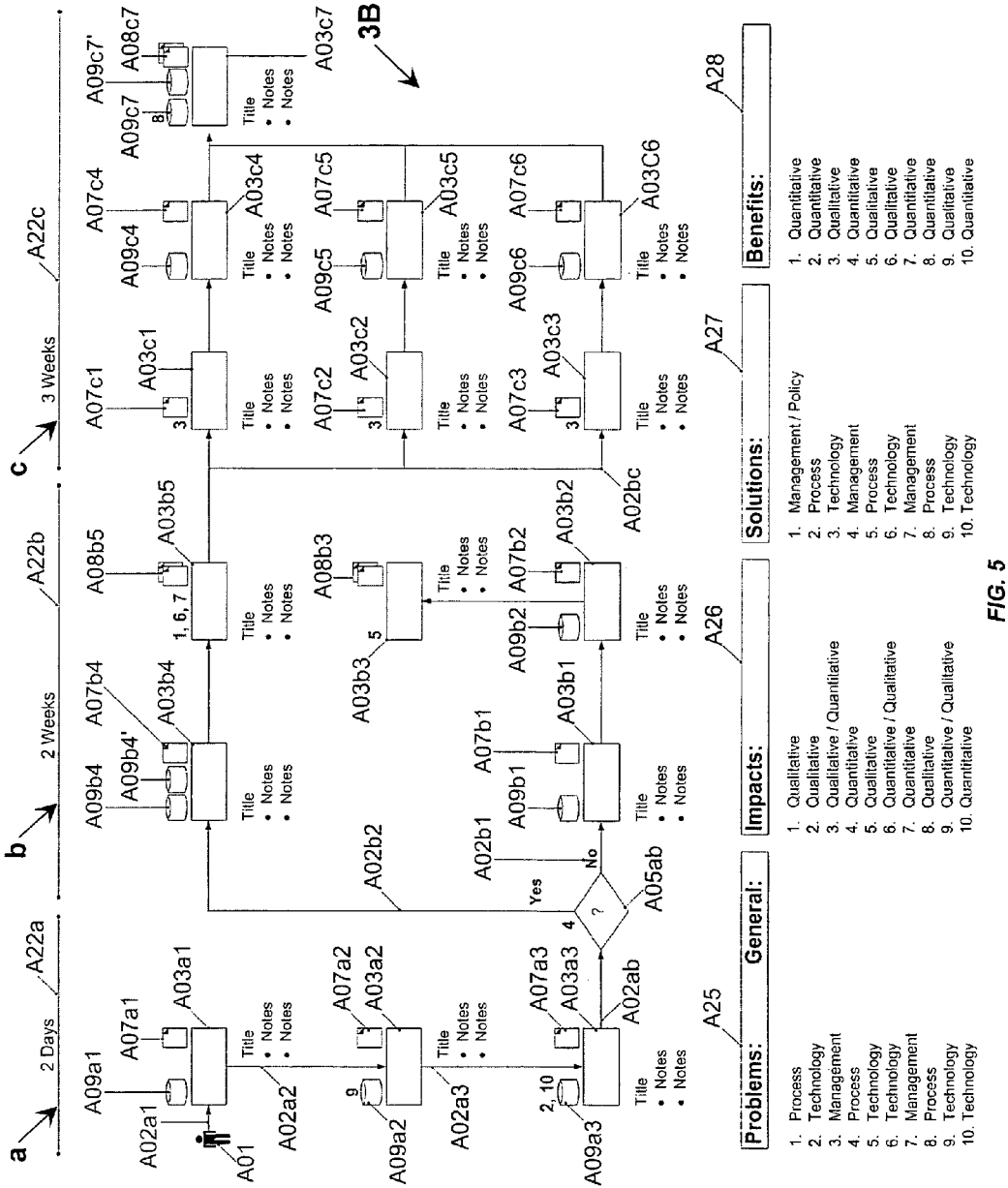
FIG. 5 is an example of a generic "As-Is" process map of the present invention.

Referring to FIG. 5, there is illustrated a generic As-Is process map 3B which discloses an overview of this portion of the present invention. The generic map 3B is a result of the As-Is process modeling for process improvement of an organization that conducts an event according to a specific organizational objective. It will be appreciated that the event includes a business process event and activity. The map specifically highlights problems, impacts and solutions that exist in each step of the process when conducting the event. In addition, the map also highlights projected benefits after completion of the As-Is process modeling.

The generic As-Is process modeling is introduced by using an example of an organization that has three connected departments in series for conducting an organizational event, wherein each department has its specific assignments and responsibilities regarding the organizational objective. Alternatively, the organization has three phases in series for conducting the event. As illustrated, there are three time line symbols positioned at the top of the map: A22a for 2 days, A22b for 2 weeks and A22c for 3 weeks. It will be appreciated that the symbol A22a for 2 days discloses a required time duration of 2 days for the first department or first phase to complete its part of the organizational As-Is process modeling, which can also be defined as a sub As-Is process modeling for the first department or first phase of the organization. Accordingly, the physical meanings of the respective symbols A22b and A22c can be interpreted to generate the designated period of time.

The As-Is modeling starts by using a symbol A01 of the customer with the symbol A02a1 showing the customer initiating the business process for conducting the event, where the process starts at the first department. As illustrated, there is no problem at step A09a1 which is positioned adjacent a process step box A03a1 and hardtop document(s) A07a1. This indicates that there is no problem in the first process step A03a1 of the departmental process through the As-Is process modeling. A problem would be illustrated with a red number.

However, when the event is transferred through another conventional way A02a2 into a second process step represented by a symbol A03a2, a problem represented by a red number of 9 is discovered on an existing computer system A09a2 through the modeling. The problem is further characterized to be in an area of technology according to a definition of "technology" following the number "9" under problem statements A25 of the map. The symbol A25 of the problem statements is positioned at a lower part of FIG. 5 which is aligned with the impact statement A26, solution statement A27 and benefits statements A28 that are positioned in series and aligned with each other.

The problem 9 is additionally classified under the impacts statement A26 to have a quantitative/qualitative nature from a definition of "quantitative/qualitative" following the number "9" to impact the event. Therefore, a solution for solving the problem 9 could be found in an area of the technology based on a definition of "technology" following the number "9" under the solution statements A27. In addition, a qualitative benefit can be suggested as the business opportunity if the problem "9" can be solved. This suggestion is derived according to a definition of "qualitative" following the number of "9" under the benefits statement A28.

It will be appreciated that the above disclosure illustrates characteristics of the present invention method of rapid workflow process modeling on a process for executing an organizational event. The method integrates the power of finding the problem(s), indicating its impact(s), defining solution(s) for resolving the problem(s) according to the three fundamentals of management, operation and technology including information technology in the triangulation principle, and finally, projecting the benefit when solving the problem(s). In short, the present invention method converts the problems to challenges and opportunities in the process of business improvement.

As further illustrated, other technology problems 2 and 10 (A25) are found on another existing system A09a3 at a third step A03a3 of the first departmental As-Is modeling. Similar to the above illustration on the problem 9, the problems 2 and 10 are rationalized to have the qualitative impacts (A26) to the event, which can both be solved (A27) in the respective process and technology areas (A28) for acquiring the quantitative benefits.

It will be appreciated that referring to the time duration symbol A22a in the map 3B, it will take 2 days as the required time for the first department to complete its sub As-Is modeling on its assignments and responsibilities for the organizational event. Therefore, the findings in the combination of problems, impacts, solutions and benefits are forwarded to a second department for its sub As-Is process modeling through a conventional transferring step A02ab.

Referring to FIG. 5, there is illustrated a decision making step as the first step for the second department to conduct its sub As-Is process modeling on the organizational event, wherein the step is represented by a decision tree symbol A05ab. Following a decision "No" labeled as A02b1 that is defined in the decision making step, the organizational event ends at a step represented by a symbol A03b3 after passing steps A03b1 and A03b2. The step is associated with a problem (A25) labeled as 5 for having qualitative impact (A26) to the event. A solution (A27) in the area of process is suggested for resolving the problem 5 to thereby gain qualitative benefit (s) (A28).

Alternatively, following another decision "Yes" labeled as A02b2 that is determined at the decision making step, the event passes by a step A03b4, where no problems are found from the modeling. However, there are the respective first technology problem 1, second technology problem 6 and a management problem 7 at a consecutive step A03b5 that follows the step A03b4. Accordingly, the modeling rationalizes that the first technology problem 1 (A25) will have qualitative impacts (A26) to the organizational event, which can be solved (A27) in an area of management/policy to thereby obtain quantitative benefits (A28). The second technology problem 6 (A25) is projected to have qualitative/quantitative impacts (A26) to the event, and can be solved (A27) in the area of technology for qualitative benefits (A28). The management problem 7 (A25) is expected to have quantitative impacts (A26) to the event, and recommended to be solved (A27) in the area of management for reaching quantitative benefits (A28).

The second department is expected to spend two weeks for completing its sub As-Is modeling of its assignments and responsibilities according to a time duration symbol A22b positioned at the top of the map 3B. Therefore, the third department can start its sub As-Is modeling on the event according to its assignments and responsibilities after the second department passes the organizational event to the third department through a conventional transferring step A02bc.

As illustrated in FIG. 5, there are three branches of steps in parallel which are simultaneously connected to the step A03b5 of the second department. The branches have the respective first steps A03c1, A03c2 and A03c3, wherein each step has the same problem 3 that is characterized in the area of management. The management problem 3 (A25) is projected to have qualitatively/quantitatively impacts (A26) to the organizational event. Therefore, a solution (A27) in the area of technology is expected to correct the problem 3 for achieving qualitative benefits (A28). As further illustrated, after solving these three management problems and passing the respective steps A03c4, A03c5 and A03c6 that are in parallel to connect to the respective steps A03c1, A03c2 and A03c3, the branches are combined together to form a loop regarding a pattern of the business process flow.

In addition, as illustrated, a problem 8 on an existing system A09c7 is discovered at a step A03c7 after these three branches A03c1, A03c2 and A03c3 are combined together in the map 3B. The problem 8 is identified in A25 under the problem statement to relate to the area of process, which will have quantitative impacts (A26) to the event. Therefore, it is recommended to improve the process (solution A27) for correcting the problem 8, so that quantitative benefits (A28) can be reached. In addition, it is determined that it is necessary to spend three weeks for the third department to complete its sub As-Is modeling according to the time duration symbol A22c.

As illustrated in FIG. 5 which shows pathways of the process flow of the organizational event on the As-Is process map, there are three basic patterns that disclose the types of process flow including linear, branched and looped patterns. The linear pattern illustrates a simple and straight line process, which is best presented in the modeling of the first department (A22). The branched pattern includes a parallel structure linked with a process which is best presented in the modeling of the first department A joined to the second department B. The looped pattern is best presented in third department C.

It will be appreciated that, referring to FIG. 2, that the As-Is modeling is validated by the end user stakeholder review 2b2. The validated outcome 2b23 will be transferred into the RWPM To-Be business process modeling phase 2b3 for producing To-Be process map/solutions 2b3a. Therefore, a sample generic To-Be process map 4B (FIG. 6) is illustrated as follows.

Figure 6:
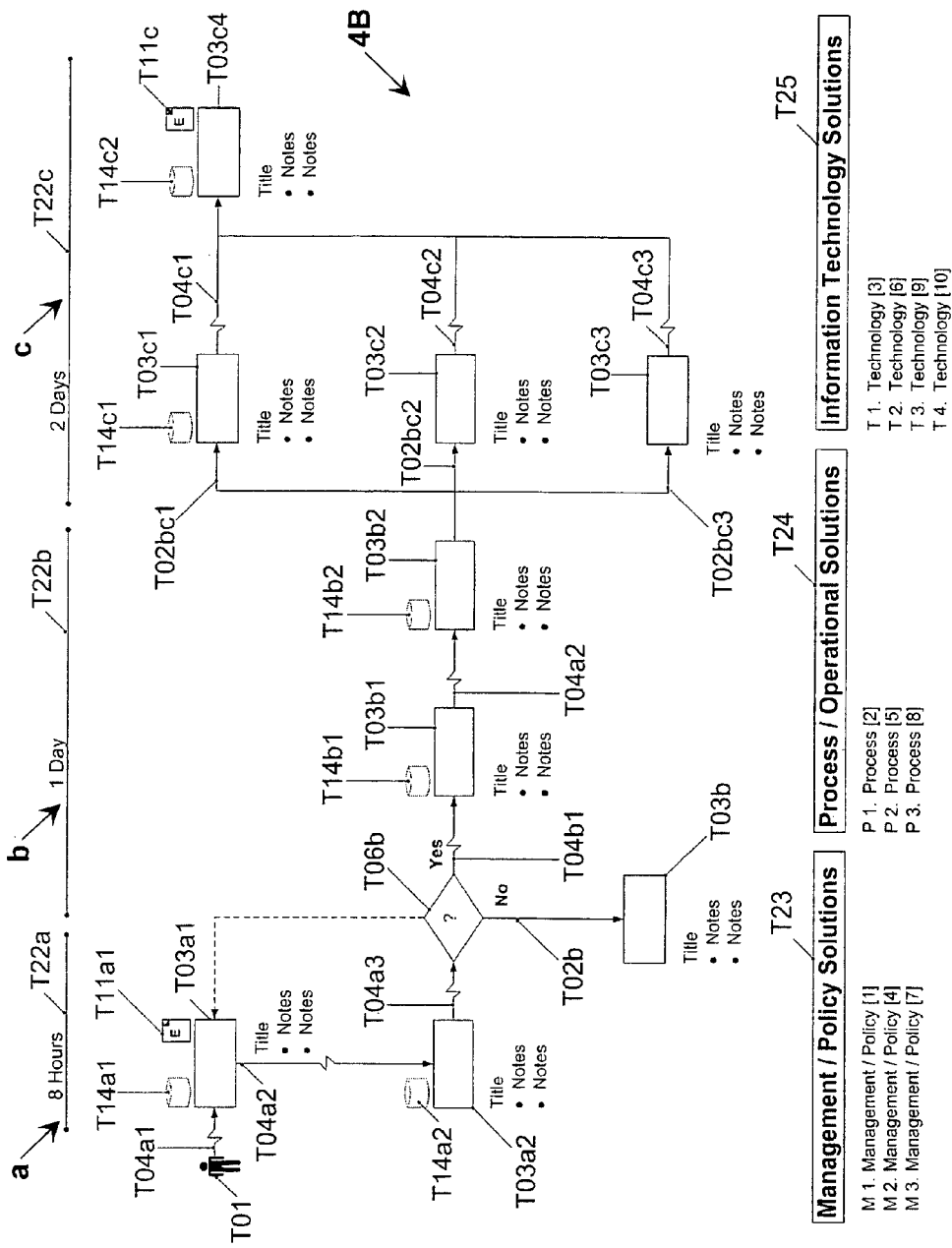
FIG. 6 an example of a generic "To-Be" process map of the present invention.

Referring to FIG. 6, there is illustrated the sample generic To-Be process map 4B that is obtained from the To-Be process modeling of the present invention. As compared with the sample generic As-Is process modeling that is illustrated in the As-Is process map 3B of FIG. 3, the To-Be business process modeling deals with the same example of the same organization having three related departments or phases to conduct the same organizational event, wherein each of the departments has the respective same specific assignments and responsibilities.

It will be appreciated that the To-Be business process map 4B results in a new process map which is transformed from the As-Is process map 3B after implementing management/policy solutions T23, process/operation solutions T24 and information technology solutions T25 that have been recommended in the As-Is modeling. The To-Be business process modeling basically revises steps in the As-Is process map including correction of the problems. Therefore, the To-be process map 4B shows what a new business process or environment would be like.

Referring to FIG. 6, under a time duration symbol T22a of 8 hours, there is illustrated blue customer T01 which is indicated as an internal or external customer to initiate the organizational event. However, instead of using the conventional way A02a1 as shown in the As-Is process map for initiating the event, a process that is carried out electronically is applied for initiating the event, which is labeled with a blue electronic arrow symbol T04a1. In addition, the same typed electronic processes T04a2 and T04a3 are applied between the respective first process step T03a1 and a second process step T03a2, and between the second step T03a2 and a decision making step T06b. Efficiency and effectiveness when conducting the organizational process will be largely improved if the process is carried out electronically. The above illustrates a first change in the To-Be process, which makes it superior to the As-Is process, wherein advanced ways are applied in the To-Be process as compared with the conventional ways in the As-Is process.

In addition, instead of having three process steps A03a1, A03a2 and A03a3 as in the As-Is map, the To-Be process map 4B only shows two process steps T03a1 and T03a2. Therefore, it will be appreciated that this is the second change for the To-Be process to be better than the As-Is process.

Furthermore, instead of using the existing computer systems and hard copy documents in the consecutive order which are labeled as the respective A09a1 and A07a1, A09a2 and A07a2 and A09a3 and A07a3 in the As-Is process, the To-Be process applies the respective new computer systems T14a1 and T14a2, in addition to only one time usage of a document in the electronic form T11a1. Therefore, it will be appreciated that according to the above comparison, application of the advanced computer equipment associated with less frequent usage of the equipment are the third change for the To-Be process, which makes it better than the As-Is process.

As illustrated in FIG. 6, the To-Be process map 4B regarding the process improvement at the first department is obtained after implementing specific process/operational solutions such as "P1. Process [2]", which is shown under the Process/Operational Solutions symbol T24. In addition, the To-Be process map is further implemented with information technology solutions such as "T3 Technology[9], T4 Technology [10]", which is shown under the Information Technology Solutions symbol T25. It will be appreciated that, since the problems 9, 2 and 10 in technology have been identified in the sub As-Is process modeling of the first department or phase, it illustrates that the To-Be process map is the outcome when the To-Be process modeling is completed after implementing statements of problems, impacts, solutions and benefits that are characterized in the As-Is process modeling for the process improvement at the first department or phase.

In summary, as compared with the prior As-Is process modeling, the To-Be process modeling in the first department possesses characteristics of having a few steps, applying an advanced process in between steps, such as T04a1, and advanced equipment such as T14a1 and T11a1 in addition to less frequent usage of the equipment. Such characteristics allow the To-Be process to achieve better business opportunities. One of the opportunities is a shorter duration time T22a of eight hours for the first department in the To-Be business process modeling, as compared with a much longer time A22a of two days of the As-Is process modeling.

It will be appreciated that the above summarized characteristics of advantages can be observed in FIG. 6 of the generic To-Be process map, which is the result of the To-Be process modeling for the respective second and third departments, or the second and third phases of the organization.

As illustrated, following a decision "No" which is made at the decision making step T06b, the outcome generated at the first department is transferred to a process step T03b through a conventional way T02b. It will be appreciated that the To-Be process map only has one process step regarding the pathway of undertaking the decision "No", which is significantly more efficient as compared with having three process steps A03b1, A03b2 and A03b3 in the As-Is process map 3B.

Alternatively, if following a decision "Yes" made at the decision making step T06b, the outcome of the first department is transferred by an electronic transfer T04b1 to a first process step T03b1 of the second department. The step T03b1, which is associated with application of a new computer system T14b1 is connected to a second process step T03b2 by the electronic transfer T04a2. The second step also applies a new computer system T14b2.

Since the problems 1, 6 and 7 have been identified and the corresponding solutions have been recommended in the As-Is process map, the To-Be process modeling has implemented the recommended solutions which include for solving problem 1 in the As-Is map, there is used the M1. Management/Policy [1] and M3. Management/policy [7] for solving problem 7 under the management/policy solutions T23 and T2. Technology [6] under information technology T25. Therefore, the To-Be process modeling at the same second department or second phase is more efficient than the As-Is modeling. The To-Be process modeling requires a time duration T22b of only one day, as compared to the required two weeks of the time A22b in the As-Is process modeling.

Therefore, the outcome of the organizational event from the second department is simultaneously transferred through the respective conventional ways T02bc1, T02bc2 and T02bc3 to the respective process steps T03c1, T03c2 and T03c3 of the third department or phase, which are in parallel to connect to the process step T03b2 of the second department. As indicated in FIG. 6, a new computer system T14c1 is applied at the process step T03c1. In addition, these three steps additionally simultaneously connect to another process step T03c4 through the respective electronic processes T04c1, T04c2 and T04c3.

It will be appreciated that each parallel pathway at the third department from the To-Be process map only includes one step labeled as the respective T03c1, T03c2 and T03c3, as compared with the respective two connected steps A03c1-A03c4, A03c2-A03c5, and A03c3-A03c6 of the same third department from the As-Is process map 3B. Therefore, the third department has simpler pathways in the To-Be process modeling. It will be further appreciated that the simplified pathway at the third department in the To-Be process map is achieved after implementation of T1 Technology [3] under information technology solutions T25. The implementation of the technology solution is recommended in the As-Is process modeling after identifying the management problem 3 under the problem statements A35 for each parallel pathway in the As-Is process modeling 3B.

As last indicated in FIG. 4B, a new computer system T14$c$2 and an electronic form T11$c$ are applied at the step T03C4 after implementation of P3 Process [8] under the process/operational solutions T24. As illustrated in FIG. 5, the process problem 8 is identified under the problem statements A25 and corresponding solution of the process is suggested under the solution statements A27 of the As-Is process map 3B.

Application of the advanced equipment for solving process and management problems results in a shorter time duration T22$c$ of 2 days at the third department for conducting the organizational event, as compared with significantly longer time duration A22$c$ of 3 weeks in the As-Is process map 3B. This illustrates the power of the present invention method.

Referring to FIG. 7, there is illustrated a generic table for potential benefit calculations during the seventh step 2$b$4$a$ of the cost benefit analysis from the present invention method. In general, the table quantifies efficiency for every problem statement. In addition, the table includes all factors that impact the organizational event, such as number and percentage of impacts, number of staff impacted by the process, percentage of time spent, staff title(s), staff pay rates, total cost per year and efficiency savings factor. It will be appreciated that, when conducting a potential benefit calculation for a real organizational event, a number of factors that would be used is dependent upon conditions of the event, so that one or more factors listed in the table could be selectively applied.

EXAMPLES

The following are examples of the present invention methodology of rapid workflow process modeling, which are offered by way of illustration only and not by way of limitation and restriction.

Referring to FIG. 8, there is illustrated a real example of an As-Is process map from modeling a process of health insurance premium reimbursement (HIPR) comprising three consecutive phases: an initial review phase "x", an authorization phase "y" and a payment phase "z".

As illustrated, an internal or external customer A01$x$ initiates a claim of HIPR through applying in a conventional way A02$x$1 for directing the claim to a first step A03$x$1 labeled as "claim submitted with original signature". The step is associated with the application of hard copy package(s) A08$x$1 and hard copy document(s) A07$x$1. During the business process at the step A03$x$1 that is charged by a pensioner, various issues are involved regarding bank statements, cancelled checks, direct deposit notifications, letters from insurance companies, Medicare cards, insurance cards and credit card statements.

As further illustrated, there is no problem that has been discovered after the As-Is process modeling at the step. Therefore, an outcome is directed to a second step A03$x$2 labeled as "initial review" that is accompanied with application of the hard copy document(s) A07$x$2. During the process at the second step, activities of a clerk typist are included, such as delivering claims, verifying medical coverage, and checking RAP to verify that a subsidy is not already being paid.

Referring to FIG. 8, it will be appreciated that after the modeling, there is also no problem discovered at the second step A03$x$2. Therefore, an outcome is further directed to the next step A03$x$3 labeled as "medical review and validation". Activities at the third step which are conducted by a benefits specialist include payment verification, issues of currency conversion from contacting the custodial bank, organizing the above information by putting it into a person's file, and adding a note sheet to the file which contains information such as phone calls and Medicare status.

As illustrated, the step A03$x$3 is associated with the application of an existing system A09$x$3 of a mainframe computer, hard copy package(s) A08$x$3, hard copy document(s) A07$x$3, file cart A21$x$3 and hard copy working file A12$x$3. However, through the sub As-Is process modeling, problems 1, 4 and 5 have been discovered, which are correlated to application of the respective hard copy package(s) A08$x$3. In addition, the impacts and solutions for the problems are also identified in addition to projected benefits if the problems were to be resolved.

Specifically, problem 1 is from ineffectiveness of the note sheet(s), such as overlooking information on the sheet(s), or keeping track of special notes. The problem causes overpayment or underpayment of money that impacts cash flow to members. In addition, the frequency of problem occurrences is observed as twice a year. Therefore, the following solutions are recommended for resolving the problem 1:

(1) capturing the claim and associated documents at the beginning of the process including the application of scanning the claim and documents;

(2) putting the note sheet(s) in an e-form;

(3) implementing a document/content management system to store documents;

(4) using the enterprise content management system (ECMS) to process the claim, or using automated workflow to process the claim;

(5) considering integration of the automated workflow and existing systems; and (6) creating capability of approval, authorization and signature.

Problem 4 concerns an issue of maintaining security with member information, such as unlocking the file cabinets including the rolling cabinets during business hours. This is not in compliance with HIPPA and potentially can cause liability due to the sensitive nature of the data. Therefore, to resolve the problem it is recommended to apply the ECMS to process the claim so that the benefit can be obtained, which benefit involves meeting the HIPPA requirements and mitigating exposure to risks and possible lawsuits.

Problem 5 arises from a need to move member files in three rolling cabinets which is laborious and time consuming. In addition, the carts being heavy may result in possible worker's compensation liability. Therefore, application of the AW/ECMS is a solution to the problem to thereby achieve the benefit of saving staff time and reducing on-the-job injuries.

When completing the As-Is modeling in the phase "x", an outcome from the modeling is forwarded to a rejection making step A05$x$. If a decision "Yes" is made to support the rejection, the outcome is sent to a step A03$y$ labeled as "sending letter to deny the claim", which is associated with an envelope A11$y$ and a vertical file cabinet A18$y$. However, problems 3 and 4 are discovered at the step It will be appreciated that problem 4 has been previously discussed. Problem 3 arises from maintaining the historical data since two files are required for one person, in addition to the historical records that must be boxed and sent to the administration service for future microfilming. The impact of problem 3 is identified as costing one week per year for a clerk typist to create new files and box up the old ones. Therefore, application of the ECMS is considered to be a solution to the problem to obtain the following benefits:

(1) making staff happier;

(2) saving storage space;

(3) staff having more time for high-level work;

(3) streamlining the claim process since staff would not have to wait for the batches of folders and multiple staff members would work on multiple files simultaneously for enhancing staff flexibility; and (4) allowing for storage of information that they do not presently have space for.

Referring to FIG. 8, if a decision "No" is made against the rejection, the outcome of the phase "x" is then transferred into the phase "y" including first and second steps $A03y1$ and $A03y2$ in a series connected to a decision making step $A05y$.

The step $A03y1$ "HIPR" is associated with application of a hard copy document (s) $A07y1$, an existing system $A09y1$ and a file cart $A21y1$. A benefits specialist manages the business process at the step, regarding actual premium paid, reimbursement eligibility, date payment made to pensioner, calculated total cost per month and year to date, and work up sheet printed out.

As illustrated, problems 1, 2, 4 and 5 are identified at the first step $A03y1$ of the phase "y" after the As-Is modeling. It will be appreciated that problems 1, 4 and 5 have been previously analyzed, including their impacts, solutions and benefits after resolving the respective problems.

Problem 2 arises from duplicating data entry into HIPR related to issue of access database and RAP related to issues of the mainframe system. Specifically, one person has to enter data into the access database to print out the workup sheet, which is used for approval. Then after approval of the workup sheet, the person has to enter the data into the RAP for payment. The problem has the disadvantage of duplicating data entry approximately 8 hours per quarter, which wastes a significant amount of time for the benefit specialist. In addition, the duplicate process can have a propensity for errors. A solution is suggested for adopting OnPoint to replace the access database and considering integration of OnPoint to the ECM/AW. Therefore, it is projected to save staff time after implementing the solution.

The second step $A03y2$ is related to authorization signature, which is conducted by a management analyst/senior management analyst for review entire files. As illustrated, problems 1, 5 and 6 are identified at the step $A03y2$, wherein the step is associated with application of a hard copy document(s) $A07y2$, a hard copy working file $A12y2$ and a file cart $A21y2$.

Problem 6 is identified as managing and processing all the paperwork that comes in with claims, such as variations of the document sizes and absence of checks. The problem impacts how to photocopy and shred the documents that were submitted, which creates more work for the staff. Solutions that are the same as those for Problem 1 are suggested to solve Problem 6, which would bring benefits that are the same as those after resolving Problems 1 and 3.

Referring to FIG. 8, after completion of modeling in the phase "y", an outcome is forwarded to the decision making step $A05y$ applying a file cart $A21y3$, wherein a senior management analyst is in charge of the activities happening at this step. The step is identified to have problems 4 and 5. As illustrated, if following a decision "No", the outcome is sent to the step $A03y$, which was previously illustrated. If following a decision "Yes", the agreed outcome is forwarded to the phase "z" through a conventional way $AO2yz$, wherein the phase "z" includes a step $A03z1$ as "payment information entered into RAP system". The step is simultaneously connected to a step $A03z2$ as "letter" and a step $A03z3$ as "records management" that are in parallel regarding the process flow.

Figure 8A:
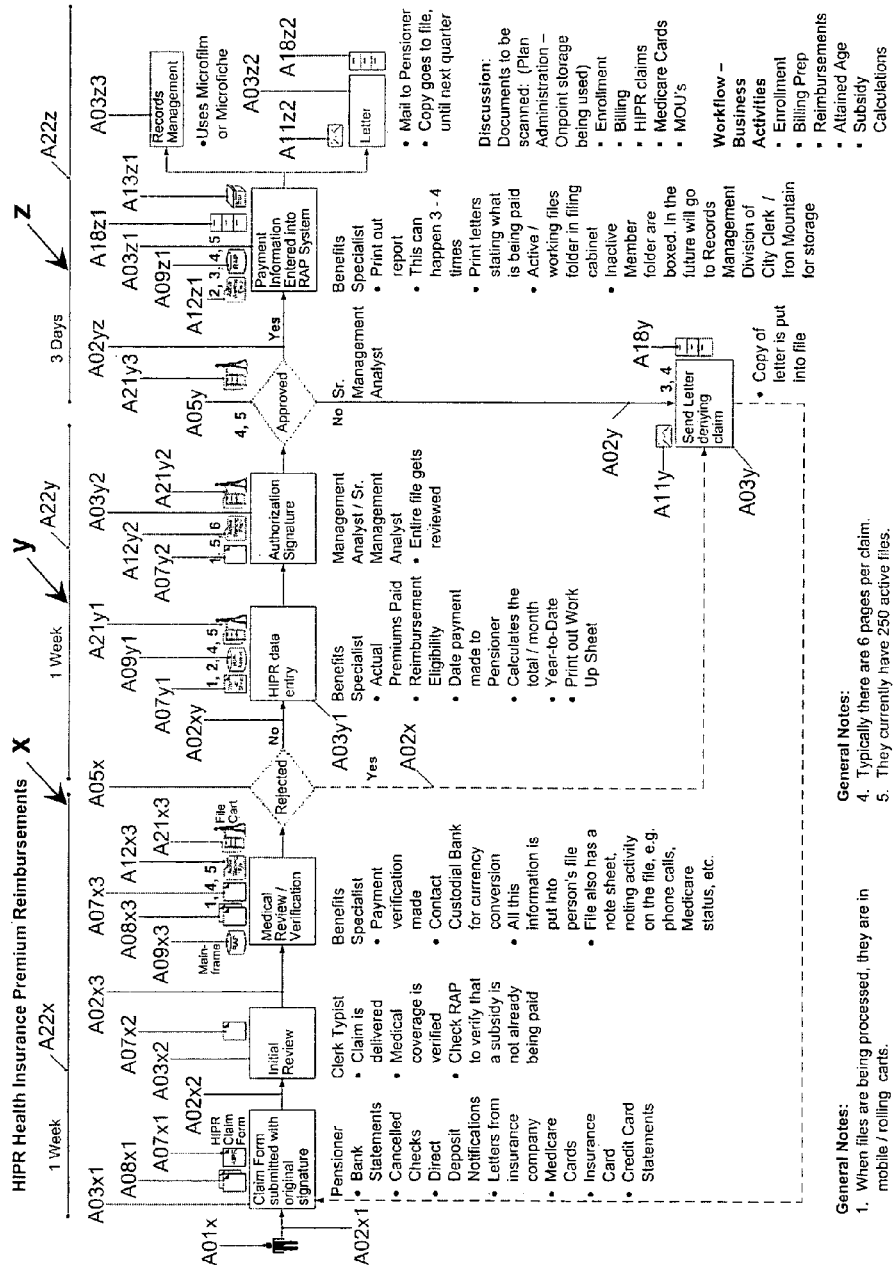

Referring to FIGS. 8A and 8B, a benefits specialist is responsible for the business activities at this step, which is associated with application of a hard copy working file $A12z1$, an existing system $A09z1$, a box $A11z1$ and a vertical file symbol $A18z1$. The activities include frequently printing out reports, printing letters stating what is paid, active/working file folder in a filing cabinet and boxing the inactive member folders. In addition, there are identified problems 2, 3, 4 and 5 at the step $A03z1$. The problems have been previously analyzed.

As illustrated, an outcome of the step $A03z1$ is simultaneously forwarded to the next steps $A03z2$ and $A03z3$, wherein the step $A03z2$ is associated with an envelope $A11z2$ and a vertical file $A18z2$. However, no problem is found at either step. In addition, activities at the step $A03z2$ involve mail to a pensioner and copies to file until next quarter.

It will be appreciated that from viewing the As-Is process map on the whole process of HIPR, besides the disclosed specific activities at the respective steps, the following are general activities in the entire HIPR process, including:

(1) when files are being processed, they are in mobile/rolling carts;

(2) this is a new program for out-of-state members;

(3) 170 claim forms are submitted/quarterly, however, they are increasing;

(4) typically there are 6 pages per claim;

(5) there are currently 250 active files;

(6) 120 files are inactive; and (7) there is a record retention schedule published by the CAO, but LAFPP has not determined how this fits into it.

Referring to FIG. 9, there is illustrated the To-Be process map which is obtained after completing the To-Be process modeling on the same event of the HIPR health insurance premium reimbursements. As illustrated on a lower part of the map, various management/policy solutions $T23q$, process/operational solutions $T24q$ and information technology solutions $T25q$ are implemented during the To-Be process modeling, regarding the problems 1-6 that are identified during the As-Is process modeling. It will be appreciated that these problems are labeled by application of the symbol "[ ]" in the To-Be process map.

For example, regarding the Problem [2] that is identified in the As-Is process map, a solution following the notation "M1" under the management/policy $T23q$ is that capturing (scanning) of the claim and its associated documents at the beginning of the process will require that a management decision be made on the allocation of resources to perform an activity that does not exist in the current business process. In addition, an additional solution following the notation "M 3" still under the management/policy $T23q$ is that the integration of the automated workflow with existing systems, i.e., OnPoint, will require that management addresses interfacing the ongoing OnPoint project with the proposed ECMS project and that appropriate resources be allocated to that effort. A solution following the notation "P 1" under the process/operation $T24q$ is to scan the HIPR claim form and its associated document at the beginning of the process. A solution following the notation "T 1" under the information technology solution $T25q$ is to implement an IBM e-form for the note sheet. In addition, an additional solution following the notation "T 2" still under the information technology solutions $T25q$ is to implement an imaging system to capture the claim and its associated documents at the beginning of the process to start the e-working file.

Regarding the problem [5], the solution from the management/policy $T23q$ is illustrated as following the notation "M 1" which is listed above. The solution from the process/ operational T24$q$ is illustrated as that following the notation "P 2", which is also listed above. Solutions following the notations "T 6" and "T 8" under the information technology solutions T25$q$ are respectively to adopt OnPoint to replace the existing HIPR access database and explore the feasibility of integrating OnPoint to the ACME/AW.

Regarding the problem [6], the solution from the process/operational T24$q$ is illustrated as that following the notation "P 2" which is illustrated above. A solution following a notation "T 5" under the information technology Solutions T25$q$ is to provide approval, authorization, and e-signature capacity.

Figure 9A:
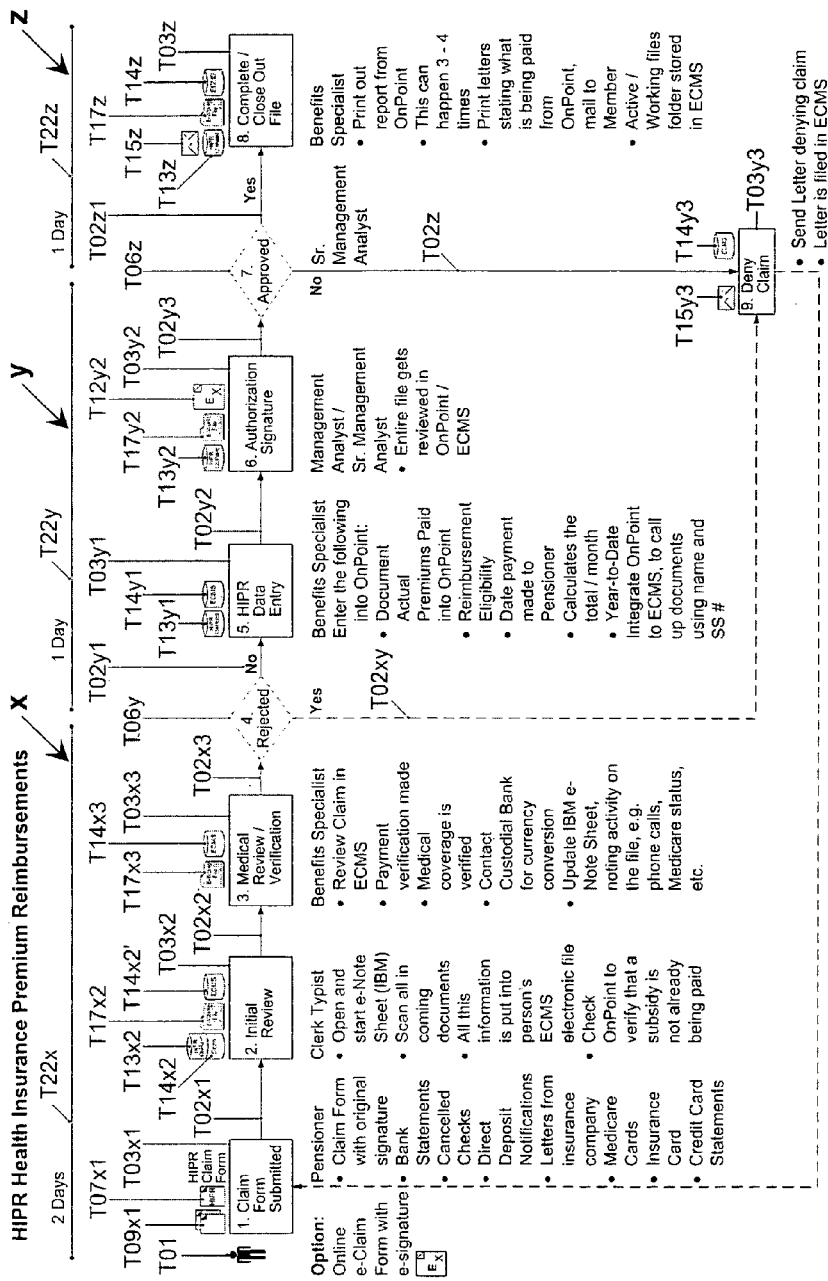

Referring to FIGS. 9A and 9B, an internal or external customer T01 initiates a claim of HIPR for sending the claim to a first step T03$x$1 labeled as "claim form submitted". The step is associated with application of hard copy package(s) T09$x$1 and a HIPR claim form. During the business process at the step T03$x$1 that is charged by a pensioner, various issues are involved regarding the claim form with original signature, bank statements, cancelled checks, direct deposit notifications, letters from insurance companies, Medicare cards, insurance cards and credit card statements.

As further illustrated, an outcome after the To-Be process modeling at the step T03$x$1 is directed to a second step T03$x$2 labeled as "initial review". The step is accompanied with application of a new database T14$x$2, an existing system T13$x$2, a blue e-working file T17$x$2 and additional new database T14$x$2'. During the process at the second step, activities from a clerk typist are included, such as opening and starting e-note sheet, scanning all incoming documents, and putting all the information into the person's ECMS electronic file, and checking OnPoint to verify that a subsidy is not already being paid.

Therefore, an outcome is further directed to the next step T03$x$3 labeled as "medical review and validation". Activities at the third step T03$x$3 which are conducted by a benefits specialist include reviewing the claim in ECMS, payment verification, medical coverage verification, currency conversion from contacting the custodial bank, and updating the IBM e-note sheet, noting activity on the file, e.g. phone calls and obtaining Medicare status. As illustrated, the step T03$x$3 is associated with application of a new database T14$x$3 of ECMS and blue e-working file T17$x$3.

When completing the To-Be process modeling in the phase "x", an outcome from the modeling is forwarded to a rejection making step T06$y$. If a decision "Yes" is made to support the rejection, the outcome is sent to a step T03$y$3 labeled as "deny claim", which is associated with a blue envelope T15$y$3 and a new database T14$y$3 of the ECMS.

Referring to FIG. 9, if a decision "No" is made against the rejection, the outcome of the phase "x" is then transferred into the phase "y" including first and second steps T03$y$1 and T03$y$2 in series connected to the decision making step T06$y$.

The step T03$y$1 "HIPR data entry" is associated with application of an existing system T13$y$1 of the HIPR OnPoint and a new database T14$y$1. A benefits specialist manages the business process at the step for entering the following into OnPoint: document actual premiums paid into OnPoint, reimbursement eligibility, date payment made to pensioner, calculated total cost per month and year to date, and integrating OnPoint to ECMS, to call up documents using name and social security number of the person.

The second step T03$y$2 is related to authorization signature which is conducted by a management analyst/senior management analyst for review entire files. As illustrated, the step is associated with application of an existing system T13$y$2 of the HIPR OnPoint, a blue e-working file T17$y$2 and an electronic form with e-signature T12$y$2.

Referring to FIG. 9, after completion of modeling in the phase "y", an outcome is forwarded to the decision making step T06$z$, wherein a senior management analyst is in charge of the activities. As illustrated, if following a decision "No", the outcome is sent to the step T03$y$3, which is illustrated before. If following a decision "Yes", the agreed outcome is forwarded to the phase "z", wherein the phase "z" includes only a step T03$z$ labeled as "complete/close out file". The step is associated with application of a blue envelope T15$z$, a blue e-working file T17$z$, an existing system T13$z$ and a new database T14$z$ of ECMS.

As illustrated, a benefits specialist is responsible for the business activities including frequently printing out reports from OnPoint which can occur 3-4 times, printing letters stating what is paid from OnPoint, e-mailing members, active/working files folder stored in ECMS.

Referring to FIG. 8, It will be appreciated that from viewing the To-Be process map on the whole process of HIPR, in addition to the disclosed specific activities at the respective steps, the following are general activities in the entire HIPR process, including:

(1) this is a new program for out-of-state members;
(2) 170 claim forms are submitted/quarterly, however, they are increasing;
(3) typically there are 6 pages per claim;
(4) there are currently 250 active files;
(5) 120 files are inactive; and
(6) there is a record retention schedule published by the CAO, but LAFPP has not determined how this fits into it.

It will be further appreciated that, as compared with the general activities in the entire HIPR process from the As-Is map, the To-Be process map has one step less than the As-Is map, which is "(1) when files are being processed, they are in mobile/rolling carts", such that the To-Be process modeling eliminates the file carts A21$x$3, A21$y$1, A21$y$2 and A21$y$3. In addition, only one step T03$z$ is in the phase "z" of the To-Be process map, as compared with three steps A03$z$1, A03$z$2 and A03$z$3. Furthermore, it is very clear that the To-Be process employs various advanced electronic apparatus, such as T14$x$2, T16$x$3 and T14$z$, as compared with the existing apparatus employed in the As-Is process map. Therefore, it is expected that the To-Be process is more efficient than the As-Is process. This rationalization can be seen from the shorter duration unit T22$x$ of 2 days in the To-Be process map, as compared with the longer duration unit A22$x$ of one week in the As-Is process map. Similar results also can be seen in the shorter duration units T22$y$ and T22$z$ of the respective one day, as compared with the longer duration units A22$y$ and A22$z$ of the respective one week and three days.

In addition, it is expected that the To-Be process will achieve the benefit of cost reduction in the HIPR process. Referring to FIG. 10, there is illustrated a table to demonstrate projected benefits after applying the present invention methodology according to the example of the HIPR health insurance premium reimbursement.

As illustrated, the identified problem is in duplicating copies in the reimbursement process and the impact of the problem is that incidents reports are being discarded without being read. Therefore, according to the contents on the left side of the table, the cost for copying paper per year is estimated as $500,000 US dollars and the cost for paper used for copying is $60,000 US dollars. However, in general 60% of the copied papers are tossed immediately, a cost to make these tossed papers is equal to $336,000 US dollars. Therefore, if implementing ECMS as a solution to replace the copied papers in the HIPR, a benefit can be projected as $268,800 US dollars per every year at an efficiency factor of 80%. This benefit is under a trade off cost of $350,000 US dollars as the initial investment of the ECMS and an ongoing yearly costs $90,000 for the ECMS maintenance. Therefore, it is expected for the HIPR process to have a break-even point within the second year after implementing the solutions. This further means that the organization can enjoy the significant cost reduction in every year after the second year if it could have the process improvement that is rationalized by the As-Is process modeling and To-Be process modeling.

It will be appreciated that the above disclosure including the HIPR example, the information technology is disclosed as a representative of the technology in the triangulation principle. It would be obvious for those of ordinary skill in art that can create a set of symbols, which are related to issues in any technology area, for example, the mechanical technology, to conduct the similar types of the As-Is and To-Be process modeling for acquiring benefits including process cost reduction.

Defined in detail for the first embodiment, the present invention is a method of rapid workflow process modeling (RWPM), comprising a triangulation that integrates management issues, operation issues and technology issues including information technology.

Defined alternatively in detail for the first embodiment, the present invention is a method of rapid workflow process modeling (RWPM), comprising: three validated phases, including a RWPM As-Is business process modeling phase, a RWPM To-Be business process modeling phase and a RWPM cost/benefit analysis phase.

Defined in detail for the second embodiment, the present invention is a method of rapid workflow process modeling (RWPM) having seven steps for analyzing an event of an organization, comprising: a step of As-Is process modeling for generating an As-Is process map, a step of problem statements, a step of impact statements, a step of solution statements, a step of benefit statements, a step of To-Be process modeling for generating a To-Be process map and a step of cost benefit analysis.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A computer implemented method for rapid workflow process modeling to analyze a business process improvement on business process implementation and review performance measurements, comprising:

implementing, by a computer, an as-is business process modeling consisting of: an as-is process mapping, a problem statements, an impacts statements, a solution statements and a benefit statements;

aggregating, by the computer, the as-is process mapping, the problem statements, the impacts statements, the solution statements and the benefit statements into an outcome;

validating, by the computer, the outcome by:

a business process owner review and validation correlated to a business unit manager review to rationalize a process and operations solution, an information technology review and validation correlated to an information technology manager review to rationalize an information technology solution, and a management review and validation correlated to an executive manager review to rationalize a management and policy solution;

transferring, by the computer, the validated outcome to a rapid workflow process modeling to-be process map and solutions that reduces operational steps to the as-is business process modeling, simplifies pathways to the as-is business process modeling and adds advanced electronic equipment to the as-is business process modeling;

entering, by the computer, the rapid workflow process modeling to-be process map and solutions into a cost and benefit analysis that generates a business process improvement quantified by a benefit forecast using a cost and benefit analysis plan;

forwarding, by the computer, the business process improvement from the cost and benefit analysis to the business unit manager review, and when the business unit manager review rejects the business process improvement from the cost and benefit analysis, the business process improvement from the business unit manager review is feed back to the business process owner review and validation, while when the business unit manager review approves the business process improvement from the cost and benefit analysis, the business process improvement from the business unit manager review is forwarded to the executive manager review;

forwarding, by the computer, the business process improvement from the cost and benefit analysis to the information technology manager review, when a decision making step approves the business process improvement and forwarding the business process improvement to back to stakeholders when the decision making step disapproves the business process improvement and when the decision making step approves the business process improvement and when the information technology manager review rejects the business process improvement from the cost and benefit analysis, the business process improvement from the information technology manager review is feed back to the information technology review and validation, while when the decision making step approves the business process improvement and when the information technology manager review approves the business process improvement from the cost and benefit analysis, the business process improvement from the information technology manager review is forwarded to the executive manager review;

forwarding, by the computer, the business process improvement from the cost and benefit analysis to the executive manager review for final approval and funding, and when a final approval and funding is approved, based on the business process improvement from each of the cost and benefit analysis, the approved business unit manager review, and the approved information technology manager review, the business process improvement will be sequentially sent to a business process implementation and review plan, a business process implementation and review, and the business process implementation and review performance measurements, while when the final approval and funding is rejected, based on the business process improvement from each of the cost and benefit analysis, the approved business unit manager review, and the approved information technology manager review, the business process improvement is feed back to the management review and validation.

\* \* \* \* \*